United States Patent [19]

Groves et al.

[11] Patent Number: 5,037,182

[45] Date of Patent: Aug. 6, 1991

[54] REARVIEW MIRROR HEAD-UP DISPLAY

[75] Inventors: Doyle J. Groves, Kokomo, Ind.; Larry D. Miller, Rochester Hills, Mich.

[73] Assignee: Delco Electronics Corporation, Kokomo, Ind.

[21] Appl. No.: 580,971

[22] Filed: Sep. 12, 1990

[51] Int. Cl.⁵ .................. B60R 1/12; G02B 27/10; G02B 5/08

[52] U.S. Cl. .................. 359/630; 359/838; 359/839

[58] Field of Search .................. 350/174, 601, 600

[56] References Cited

U.S. PATENT DOCUMENTS 4,499,451  2/1985  Suzuki et al. .................. 340/98
4,588,267  5/1986  Pastore .................. 350/600
4,630,904  12/1986  Pastore .................. 350/600
4,821,019  4/1989  Taylor .................. 362/83.1
4,882,565  11/1989  Gallmeyer .................. 350/600

OTHER PUBLICATIONS

Patent Cooperation Treaty Application PCT/US81/01663, Hackewicz Selected pages from Melles Griot Lens Catalog published in 1988.

Primary Examiner—Jon W. Henry
Attorney, Agent, or Firm—Anthony Luke Simon

[57] ABSTRACT

A self contained interior rearview mirror unit for a vehicle provides a head-up display image of vehicle information at a distance in front of the vehicle operator.

11 Claims, 1 Drawing Sheet

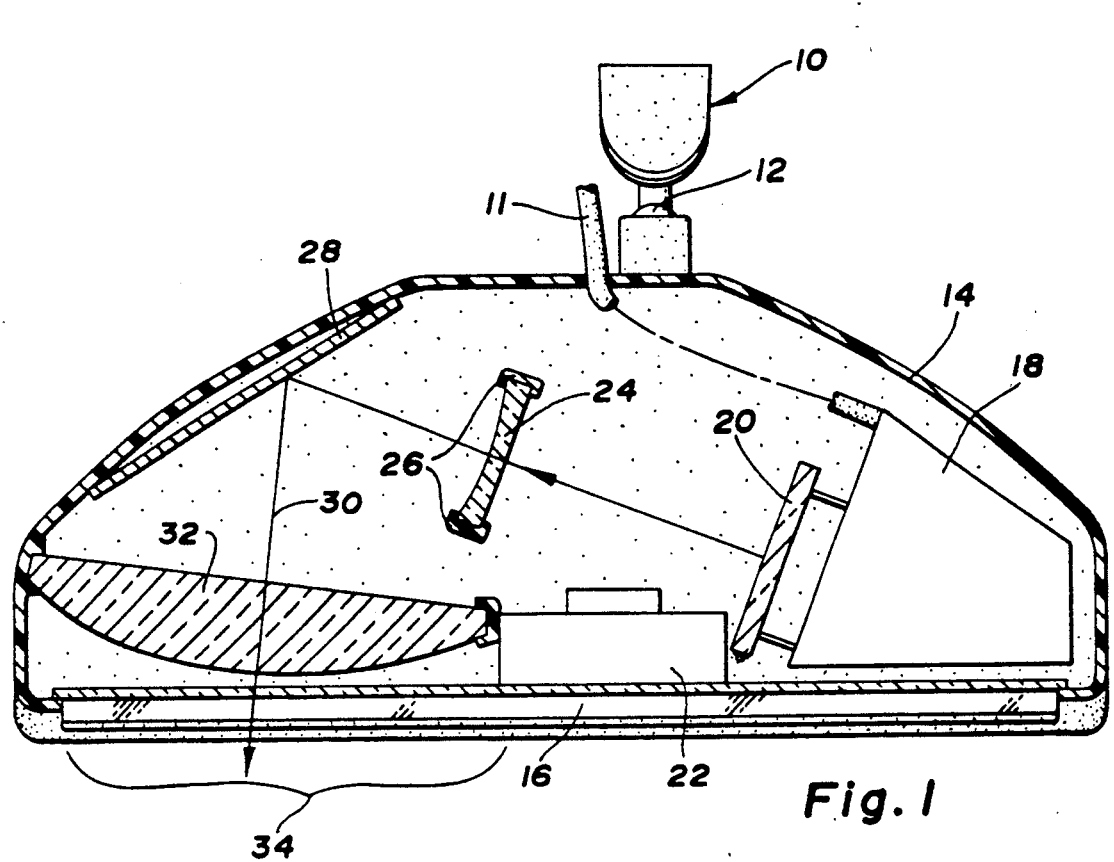
Fig. 1
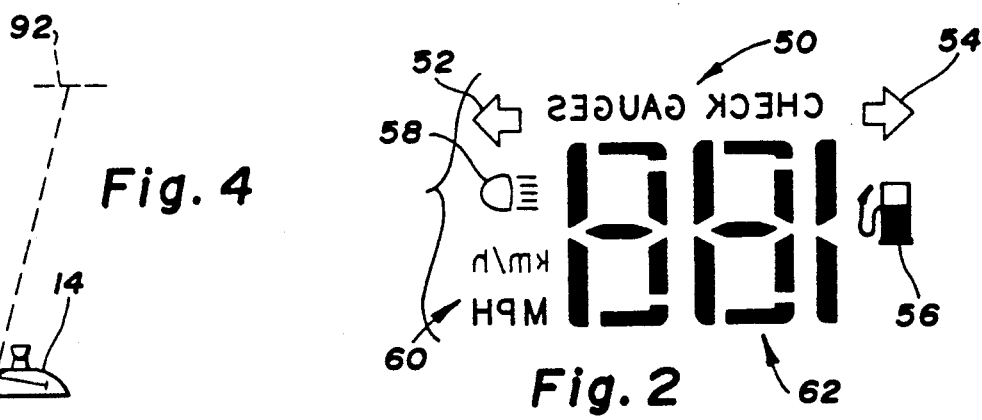
Fig. 4
Fig. 2
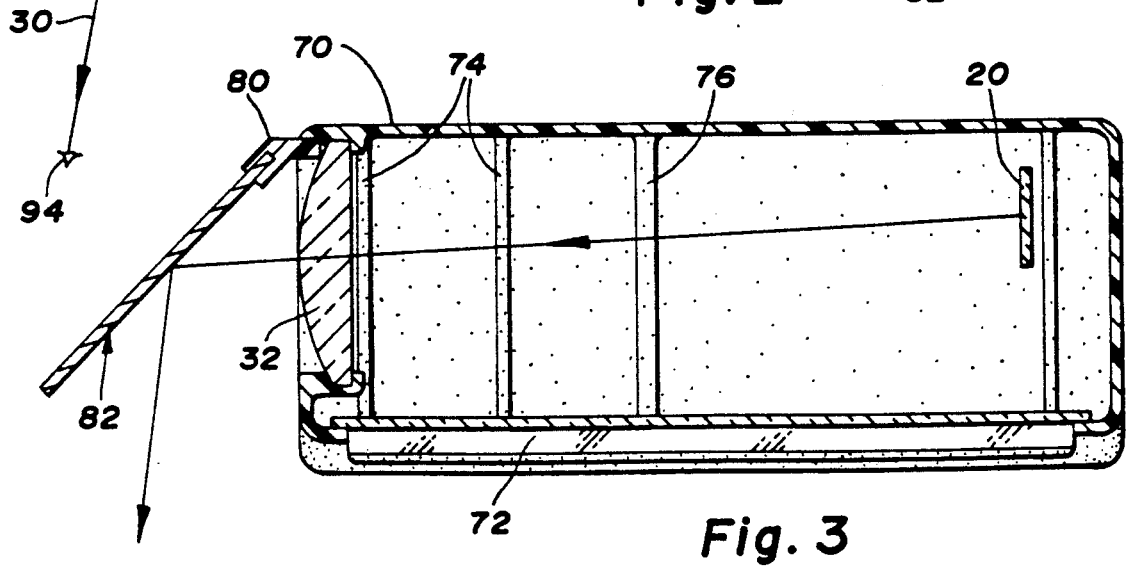
Fig. 3

REARVIEW MIRROR HEAD-UP DISPLAY

An apparatus attached to the interior rearview mirror of a vehicle provides a head-up display image of relevant vehicle information at a distance in front of the vehicle operator.

BACKGROUND OF THE INVENTION

Head-up displays (HUDs) have long been used in airplanes to aid the pilots. The HUD reflects information the pilot needs off of a half mirror or the windshield and projects that information at a distance in front of the plane so that the pilot does not have to look into the cockpit to see the information.

More recently, HUDs have been used in automotive applications in which the image is projected up and reflected off of the vehicle front windshield to appear at a distance in front of the driver. In such cases the front windshield is used as a combiner, allowing the HUD image to appear together with the view through the front windshield. With a HUD in a vehicle, the driver does not have to adjust his/her eyes from the road to read information, such as vehicle speed, which is normally displayed in the vehicle instrument panel.

One limitation of HUDs is the space required for the display source and optics. In the past, the display source and optics of the HUD have been placed in or on the instrument panel. The difficulty in this placement of the display source and optics is that the instrument panel usually has very little space available for such systems.

Another limitation with HUDs reflected off of the front windshield is that the windshield, because of its shape, is an imperfect combiner. The result is that the reflected image often appears distorted. In addition, the image reflected off of the front windshield is not very bright because normal windshield glass does not reflect a high percentage of light.

A further limitation of previous HUDs is that they must be tailored to the specific vehicle model in which they are used, making new model implementation difficult and expensive.

What is desired is a head-up display that does not compete for valuable space in the instrument panel and that provides a bright image of vehicle information so that the vehicle driver does not have to adjust eye focus to view the image. It is additionally desirable to have a HUD that is easily adaptable to different model vehicles.

SUMMARY OF THE PRESENT INVENTION

The present invention mounts the display and optical components of a head-up display in a self contained interior rearview mirror unit so that the components do not have to compete for room in the instrument panel. The invention also includes its own combiner or mirror so the projected image is bright and has minimal distortion. The result is a rearview mirror HUD that is easily adaptable to different model vehicles.

The rearview mirror head-up display includes means for displaying information to be projected as an image, means for projecting the image, and means for combining the image with visual information outside the vehicle, all packaged within a self-contained rearview mirror unit.

In the preferred implementation, the image creating means includes a vacuum fluorescent display for displaying information such as vehicle speed. The projecting means includes first and second lenses, the first lens a negative lens which creates a reduced size first virtual image of the vacuum fluorescent display and the second lens a positive lens which magnifies and projects a second virtual image of the first virtual image. A fold mirror is included between the first and second lenses to save space. The combining means is a partially silvered portion of the rearview mirror which reflects an image of the scene through the rear window of the car and combines that reflected image with the image projected by the positive lens.

BRIEF DESCRIPTION OF THE DRAWING

FIG. 1 is an illustration showing a complete head-up display packaged within an interior rearview mirror unit according to a preferred embodiment of this invention.

FIG. 2 is a sample layout for the image source.

FIG. 3 is an illustration showing a second embodiment of the rearview mirror head-up display.

FIG. 4 is a schematic drawing showing the projected image in relation to the rear view mirror unit and the operator's eye.

DETAILED DESCRIPTION OF THE INVENTION

The rearview mirror HUD will be explained with reference to the preferred implementation. Referring to FIG. 1, the rearview mirror 16 is attached to a tailored housing 14 which holds the HUD components, including the display driver circuit 18, the image source 20, the negative lens 24, the fold mirror 28, and the positive lens 32. The housing is attached to a conventional mount 10, which is mounted to the front windshield of the vehicle in a conventional manner. The ball joint 12 is tighter than conventional ball joints for rearview mirrors to compensate for the additional weight of the HUD components. The housing 14 is molded out of plastic and its rounded shape does not significantly interfere with the vehicle operators view through the front windshield.

The cable 11 provides the electronic data signals for the display driver circuit 18. The cable 11, can be mounted along the perimeter of the front windshield (not shown), hidden by the vehicle interior trim (also not shown), entering the housing 14 near the mirror mount 10. The information contained in cable 11 is conventional information used to drive conventional digital instrument panel displays, such as a digital speed signal.

Referring to FIG. 2, the image source 20 (FIG. 1) for the preferred implementation of the invention includes a digital speedometer 62, a gauge warning indicator 50, turn signal indicators 52 and 54, a low fuel indicator 56, a high beam indicator 58, and a speedometer scale indicator 60. Referring again to FIG. 1, an example cable 11 configuration is an eleven conductor cable with different conductors carrying the ignition voltage, ground, parking light dimming signal, HUD dimming signal, low fuel signal, check gauges signal, right turn signal, left turn signal, high beam signal, English/metric signal, and serial vehicle speed signal. The serial speed signal may be in the form of pulses, for example 4000 pulses per mile. The display driver circuit 18 uses these signals to drive the image source 20 (see also FIG. 2) and is easily implemented by one skilled in the art. For purposes of display brightness, the image source 20 is preferably a vacuum fluorescent display.

Lens 24, mounted to the housing 14 by brackets 26, projects a virtual image of the display 20. Preferably, lens 24 is a plano-concave lens with a focal length, f, of −50 mm. The lens 24 is placed 50 mm in front of vacuum fluorescent display 20 and projects a half size virtual image of the display 25 mm in front of the display. Although the plano-concave lens 24 is not necessary for the purposes of this invention, it is preferred because it lessens the amount of space required between the image source 20 and the magnifying lens 32. The image created by lens 24 is reflected off of the fold mirror 28 and projected by lens 32. Because the fold mirror inverts the image, the image source 20 must appear backwards (see FIG. 2) for the projected display to be properly readable by the vehicle operator. Fold mirror 28 folds the optical path 30 reducing the space required by the optics.

The lens 32 is preferably a plano-convex lens with a focal length of 150 mm. The plano-convex lens 32 projects a primary image, which is a magnified virtual image of the half size virtual image. The primary image is projected approximately 2 meters behind the lens 32, or about 2.5 meters from the driver's eye position so as to appear to be floating above the front bumper of the vehicle. FIG. 4 shows the projected primary image 92 at a distance in front of the operator's eye 94 and the rear view mirror housing 14.

The rearview mirror 16 is similar to a conventional mirror with the modification that the area in front of lens 32, designated by reference numeral 34, is partially silvered, creating a half mirror. The rest of mirror 16 is a complete mirror. Like conventional mirrors, the mirror is adjustable for day and night viewing via a standard flip mechanism represented by box 22. It should be noted that, although in the preferred implementation, the mirror 16 flips between two positions for day and night viewing, the housing 14 and the HUD components therein do not move when the mirror 16 so flips. This prevents the HUD image from moving outside of the vehicle operator's view when the mirror 16 is flipped. Although the flip mechanism is not illustrated in detail in the drawing, it is easily implemented by one skilled in the art. For example, the mirror 16 is pivotably mounted to the housing 14 at the top and the flip lever controls the position of the bottom of the mirror to change between day and night viewing.

An operator viewing the rearview mirror HUD will see the projected image in combination with scenery to the rear of the car reflected in the rearview mirror. The partially silvered portion 34 of mirror 16 both reflects the rear scenery and allows the projected image to be viewed so that it appears to float in the reflected rear scenery.

The projected image appears to the vehicle operator only as long as one of the operator's eyes is within the eyebox, or viewing window, which can be described as the outside bounds for an optical path leading through the lenses to the image source 20. If lens 32 is created from a round lens with a 105 mm diameter and squared so that its vertical height is 51 mm, the viewing window is approximately 77.5 mm wide when the operator's eye is 500 mm from the rearview mirror.

Care must be taken to assure that the optical path of the HUD image falls within the optical path of the desired rear scenery reflected in the rearview mirror. One satisfactory alignment for optical path 30 when passing through the mirror 16 in a system with the above described parameters is seven degrees toward the vehicle operator off the orthogonal axis of the mirror 16. For different implementations, however, the desired optical path may vary.

For considerations of weight, the optical components of the above system, including the lenses 32 and 24 and mirror 28, may be manufactured from plastic. More specifically, acrylic lenses are suggested. This improvement will reduce the amount of stress on ball joint 12.

The above described rearview mirror HUD is just one embodiment of the invention. The invention may also appear in other embodiments as it encompasses any use of the rearview mirror unit as a place to mount a self-contained HUD system. For example, the invention may appear as in FIG. 3.

In the example illustrated in FIG. 3, the housing 70 for the HUD system is rectangular in shape. The image source 20 provides the image to be projected by the single lens 32. In this embodiment the rearview mirror itself is not used as a combiner, instead, a separate combiner 82 is mounted to the housing 70 via bracket 80. Combiner 82 combines the projected image with scenery through the front windshield of the vehicle instead of scenery reflected in the rearview mirror. Baffles 74 and 76, on the bottom of housing 70, approximately 3 mm and 6 mm in height, respectively prevent double images reflected off the interior surfaces of the housing 70 from appearing to the vehicle operator. It should also be noted that with only one lens, the required distance between the image source 20 and the lens 32 is increased to achieve the same image size and eyebox as in the example illustrated in FIG. 1.

It will be clear to those skilled in the art that the specific lens arrangements shown are not limiting on the present invention. The lens system of the rearview mirror HUD may include lenses other than the plano-concave and plano-convex lenses and may also contain three or more lenses, depending on the desired system parameters.

Various other improvements and modifications to the subject invention may occur to those skilled in the art and will fall within the scope of the invention as defined below.

The embodiments of the invention in which an exclusive property or privilege is claimed are defined as follows:

1. A viewing apparatus for the operator of a motor vehicle comprising:
   a housing mounted within the vehicle forward of the operator defining a cavity having an aperture facing rearward of the operator;
   display apparatus mounted in said cavity and including a display source and projecting means for projecting a primary virtual image of the display source viewable through the aperture by the operator appearing at a distance in front of the operator; and
   a partially reflective combiner element mounted in the aperture of said housing so as to combine the projected primary virtual image with a reflected image of a view rearward of the vehicle.

2. The apparatus in claim 1 wherein the display source includes a vacuum fluorescent display.

3. The apparatus in claim 1 wherein the projecting means includes first and second lenses, the first lens a negative lens projecting a reduced size virtual image of the displayed information and the second lens a positive lens projecting the primary image which is a projection of the reduced size image.

4. The apparatus in claim 3 wherein the first lens is a plano-concave lens and the second lens is a plano-convex lens.

5. The apparatus in claim 1 also including a fold mirror along the optical path between the display source and the partially reflective combiner element.

6. The apparatus in claim 1 wherein the partially reflective combiner element includes an interior rearview mirror comprising a partially mirrored portion allowing the projected primary image to be seen through the partially mirrored portion.

7. The apparatus in claim 6 wherein the interior rearview mirror is positionable for day and night viewing by movement of a lever and wherein the lever movement does not affect viewing of the projected primary image.

8. The apparatus in claim 1 wherein the housing includes a rounded rear portion whereby the vehicle operator's vision of scenery forward of the vehicle is not significantly impaired.

9. A viewing apparatus for the operator of a motor vehicle comprising:
a housing mounted within the vehicle forward of the operator defining a cavity having an aperture facing rearward of the operator and having a rounded rear portion whereby the vehicle operator's vision of scenery forward of the vehicle is not significantly impaired;
display apparatus mounted in said cavity and including a display source and projecting means for projecting a primary virtual image of the display source viewable through the aperture by the operator, the projecting means including first and second lenses, the first lens a plano-concave lens projecting a reduced size virtual image of the displayed information and the second lens a plano-convex lens projecting, at a distance behind the second lens, the primary virtual image which is a virtual image of the reduced size virtual image, the display apparatus also including a fold mirror along the optical path between the display source and the second lens; and
an interior rearview mirror mounted in the aperture of the housing, containing a partially mirrored portion allowing the primary virtual image to be seen through the partially mirrored portion, combining the projected virtual image with a reflected image of a view rearward of the vehicle, and positionable for day and night viewing by movement of a lever wherein the lever movement does not affect viewing of the projected image.

10. A viewing apparatus for the operator of a motor vehicle comprising:
a housing containing an interior rearview mirror mounted within the vehicle forward of the operator defining a cavity having an aperture;
display apparatus mounted in said cavity and including a display source and projecting means for projecting a virtual image of the display source along an optical path through the aperture; and
a partially reflective combiner element mounted to the housing and combining the projected virtual image with a view forward of the vehicle.

11. A head-up display for a vehicle comprising:
means for displaying information to be projected;
means for projecting the information to be viewed as an image along an optical path; and
means for combining the image with separate visual information such that a vehicle operator can view the image without having to significantly adjust eye focus, the displaying means, projecting means, and combining means all packaged within a self-contained interior rearview mirror unit.

* * * * *